Figure 13:
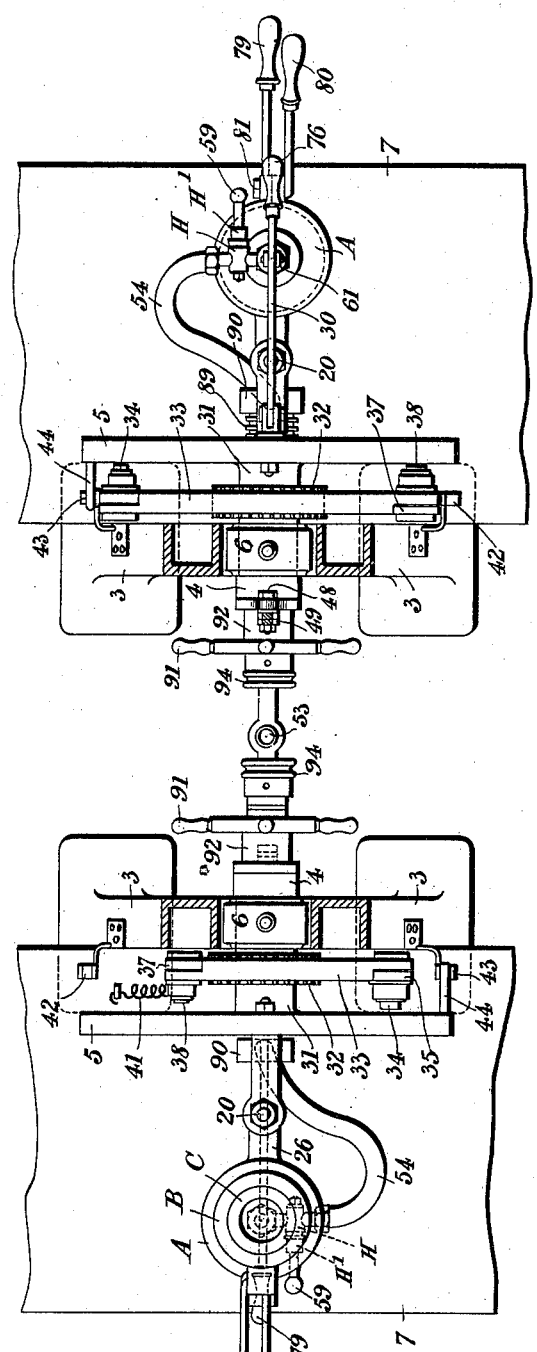

No. 656,286.  
L. GROTE.  
GLASS BOTTLE BLOWING MACHINE.  
(Application filed Mar. 5, 1900.)  
Patented Aug. 21, 1900.
(No Model.) 9 Sheets—Sheet 1.
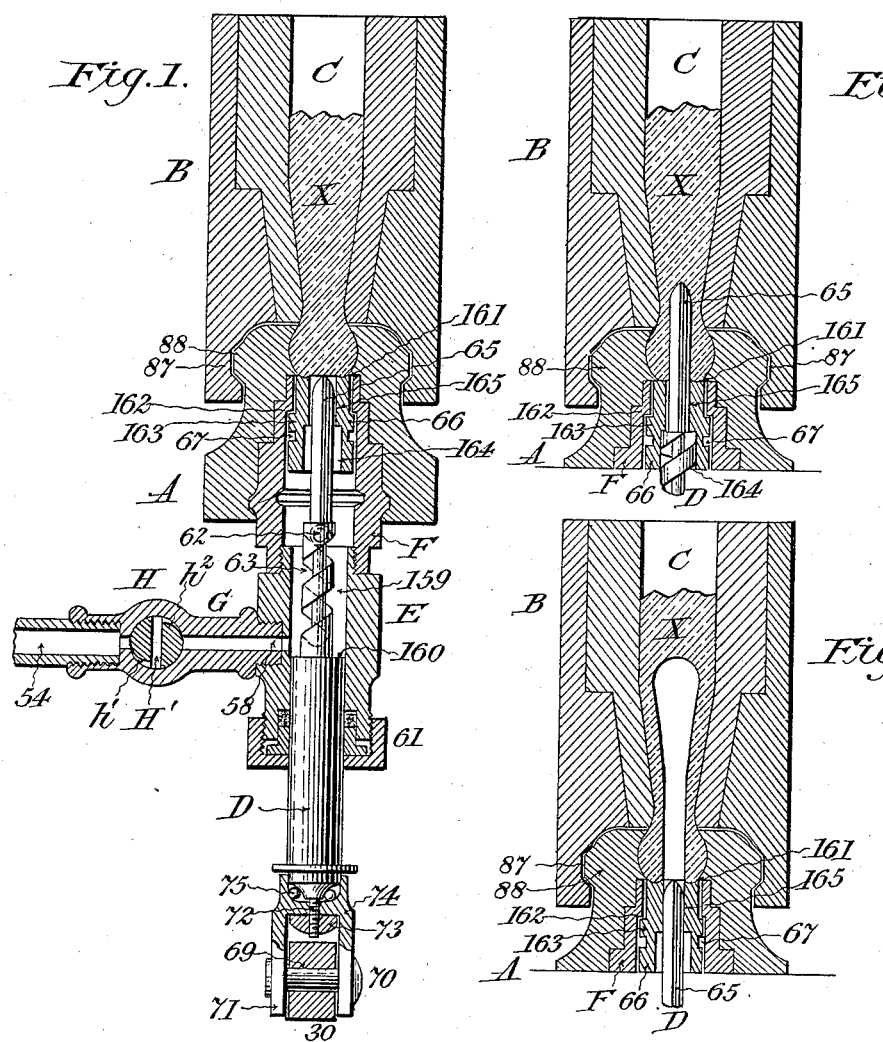
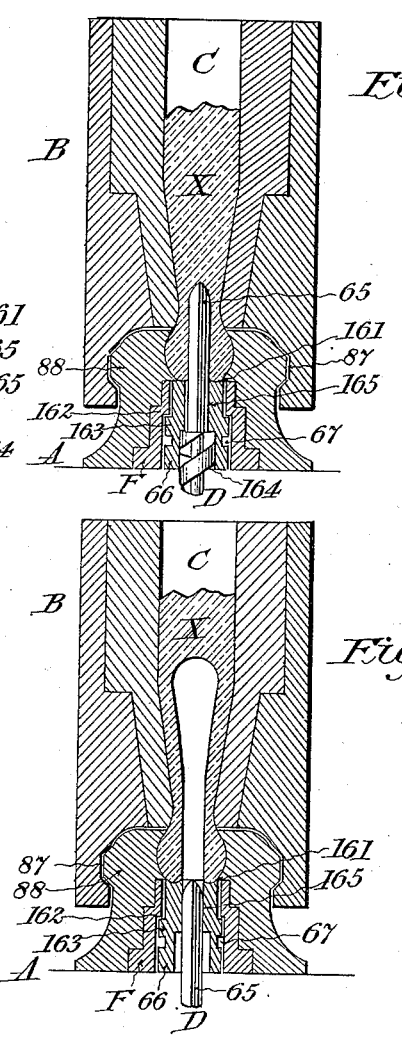
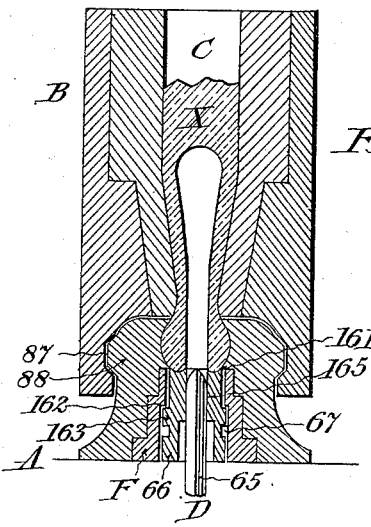
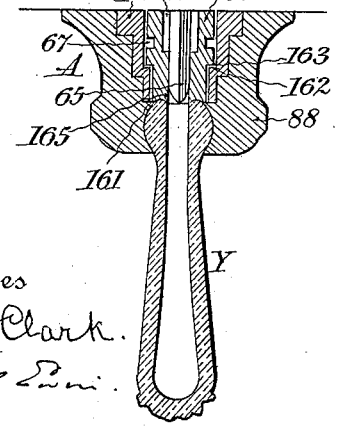
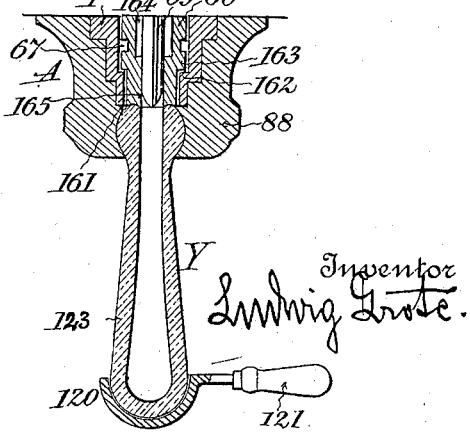
Witnesses  
Inventor  
Ludwig Grote.

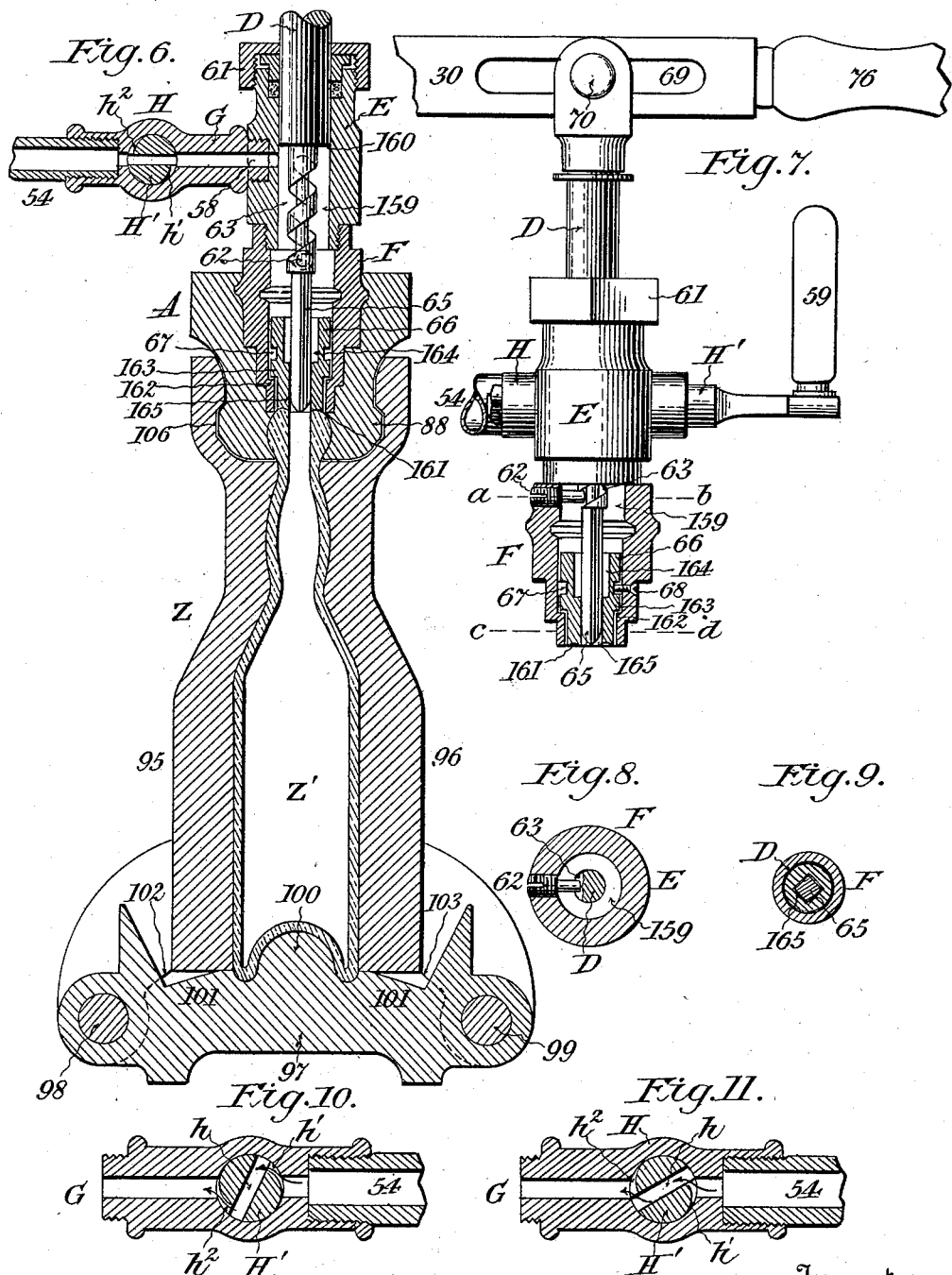

No. 656,286. Patented Aug. 21, 1900.
L. GROTE.
GLASS BOTTLE BLOWING MACHINE.
(Application filed Mar. 5, 1900.)
(No Model.) 9 Sheets—Sheet 3.
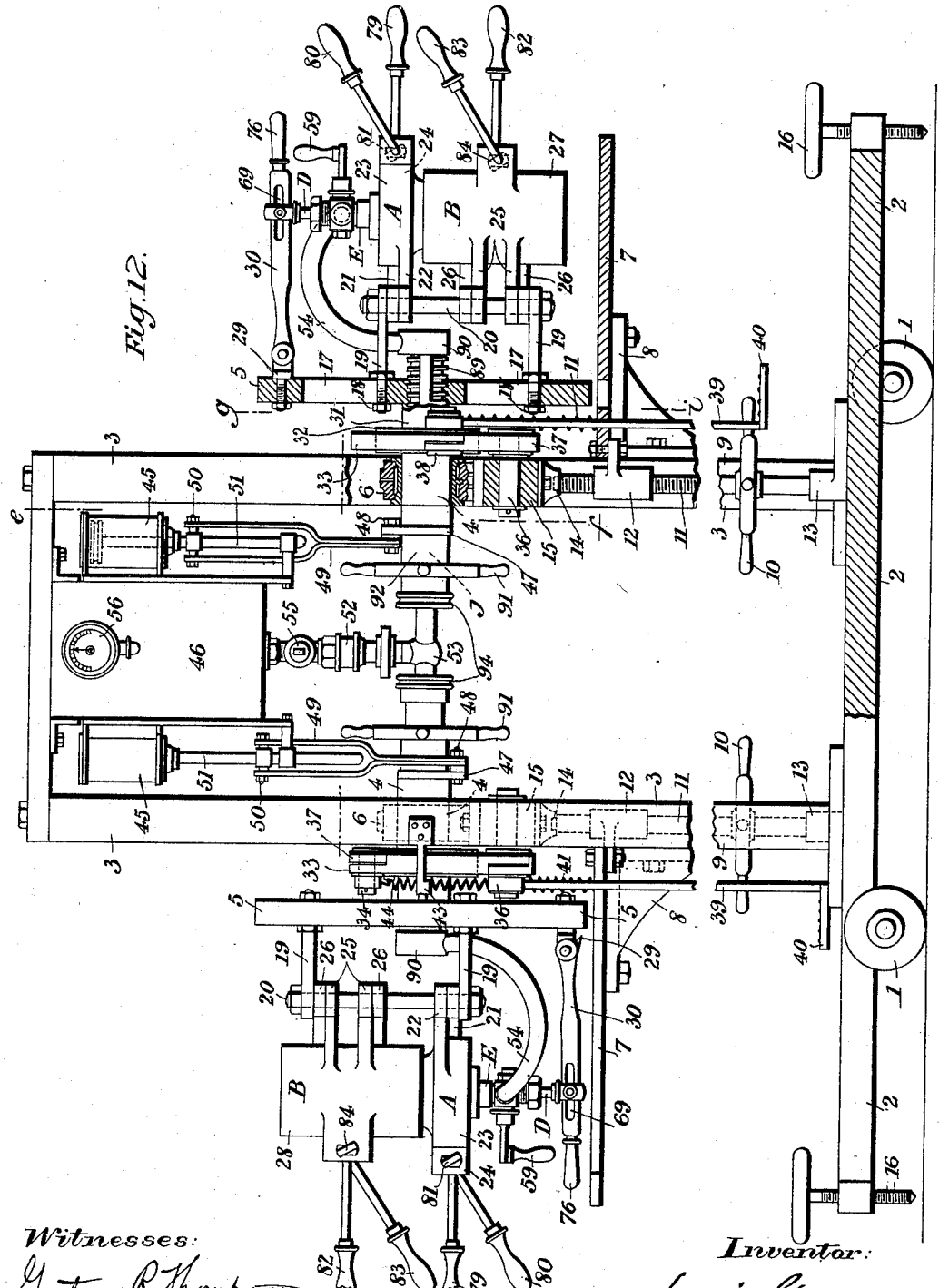
Witnesses:
Gustave R. Thompson
John Chalmers Wilson
Inventor:
Ludwig Grote
by Wilkinson & Fisher
Attorneys.

No. 656,286. Patented Aug. 21, 1900.
L. GROTE.
GLASS BOTTLE BLOWING MACHINE.
(Application filed Mar. 5, 1900.)
(No Model.) 9 Sheets—Sheet 4.

Witnesses:
Inventor:
Attorneys.

No. 656,286. Patented Aug. 21, 1900.
L. GROTE.
GLASS BOTTLE BLOWING MACHINE.
(Application filed Mar. 5, 1900.)
(No Model.) 9 Sheets—Sheet 5.

No. 656,286. Patented Aug. 21, 1900.
L. GROTE.
GLASS BOTTLE BLOWING MACHINE.
(Application filed Mar. 5, 1900.)
(No Model.) 9 Sheets—Sheet 6.

Witnesses:
Gustave R. Thompson
John Chalmers McIlroy

Inventor:
Ludwig Grote
by Philipson & Fisher
Attorneys.

No. 656,286. Patented Aug. 21, 1900.
L. GROTE.
GLASS BOTTLE BLOWING MACHINE.
(Application filed Mar. 5, 1900.)
(No Model.) 9 Sheets—Sheet 7.

Witnesses:
Gustave R. Thompson.
John Chalmers Wilson

Inventor:
Ludwig Grote
by Wilkinson & Fisher
Attorneys.

THE NORRIS PETERS CO., PHOTO-LITHO., WASHINGTON, D. C.

No. 656,286. Patented Aug. 21, 1900.
L. GROTE.
GLASS BOTTLE BLOWING MACHINE.
(Application filed Mar. 5, 1900.)

(No Model.) 9 Sheets—Sheet 8.

Witnesses: Inventor:

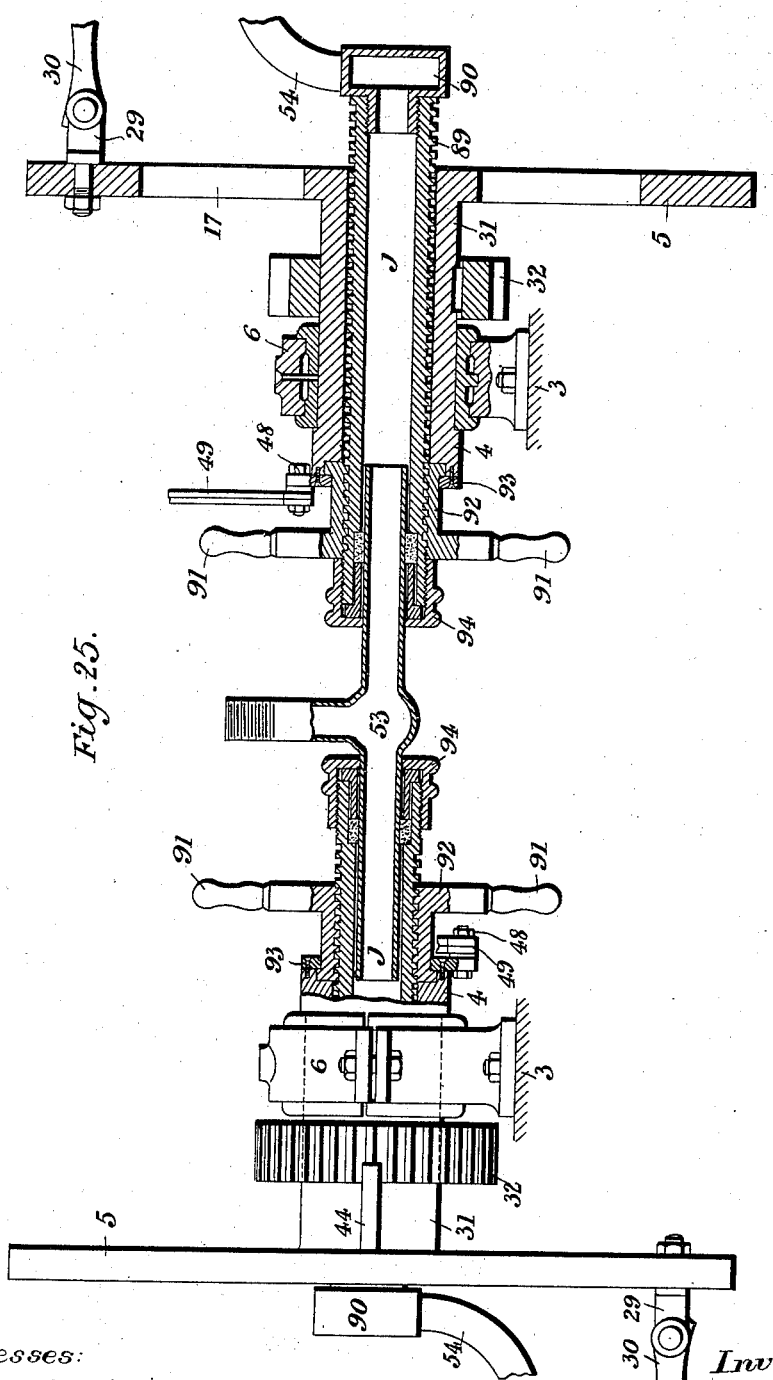

UNITED STATES PATENT OFFICE.

LUDWIG GROTE, OF LONDON, ENGLAND, ASSIGNOR TO THE GROTE BOTTLE MACHINE COMPANY, OF JERSEY CITY, NEW JERSEY.

GLASS-BOTTLE-BLOWING MACHINE.

SPECIFICATION forming part of Letters Patent No. 656,286, dated August 21, 1900.

Application filed March 5, 1900. Serial No. 7,376. (No model.)

*To all whom it may concern:*

Be it known that I, LUDWIG GROTE, factory manager, a subject of the Emperor of Germany, residing at 84$^B$ East India Dock road, London, England, have invented certain new and useful Improvements in or Relating to Glass-Bottle-Blowing Machines, of which the following is a specification.

This invention relates to the manufacture of glass bottles as practiced in part by means of machinery. In my specification forming part of United States Letters Patent No. 628,313, dated the 4th day of July, 1899, I set forth such machinery comprising molds in which the proper quantity of glass for the parison is measured and the lip portion or head of the bottle is cast in inverted position, a mouth-forming and air-admitting plunger, means for reversing and exposing the parison, and finishing-molds within which the blowing of the bottle by compressed air is completed.

The first part of the present invention relates to the means or appliances for forming the initial cavity in the glass and shaping the mouth or interior of the head and neck of the bottle, which operations have heretofore been attended by practical difficulties and as regards the formation of symmetrical mouths of uniform dimensions adapted to receive and hold cork stoppers have not heretofore been successful. According to the present invention the initial cavity is formed in the glass and the mouth of the bottle is completed by an imperforate plunger having a mouth-forming portion or point of square or equivalent shape in cross-section, and that is rapidly rotated simultaneously with its reciprocation, its insertion being also accompanied by a sufficient flow of air around the same to preclude any adhesion of the molten glass thereto. The objects of this part of the invention are to provide the glass within the neck-mold and parison-mold with an initial cavity preliminary to the blowing operation, to produce at the same time a perfectly round and symmetrical cork-receiving mouth that will be uniform in all bottles produced by means of a given plunger, to prevent any escape of the molten glass around a loose plunger projected upwardly into the same, to prevent any adhesion of the molten glass to the plunger, and to prevent the disruption of the finished bottle by excessive air-pressure within it.

According to the second part of the invention the neck-mold, parison-mold, and plunger, with their appurtenances, are reversed by means of a treadle and peculiar motion-transmitting devices, and the air for the blowing operation is pumped by the same means in part, as hereinafter set forth. The objects of this part of the invention are to render both hands of the operative free from the work of reversing the parison, so that they may be utilized for the manipulation of the glass, to utilize the parison-reversing movement for pumping the required air, to adapt bottle-blowing machines to be used where there is no independent supply of compressed air, and to facilitate regulating the pressure of the air within the bottles.

The improved machine is illustrated in the accompanying drawings, in which—

Figure 14:
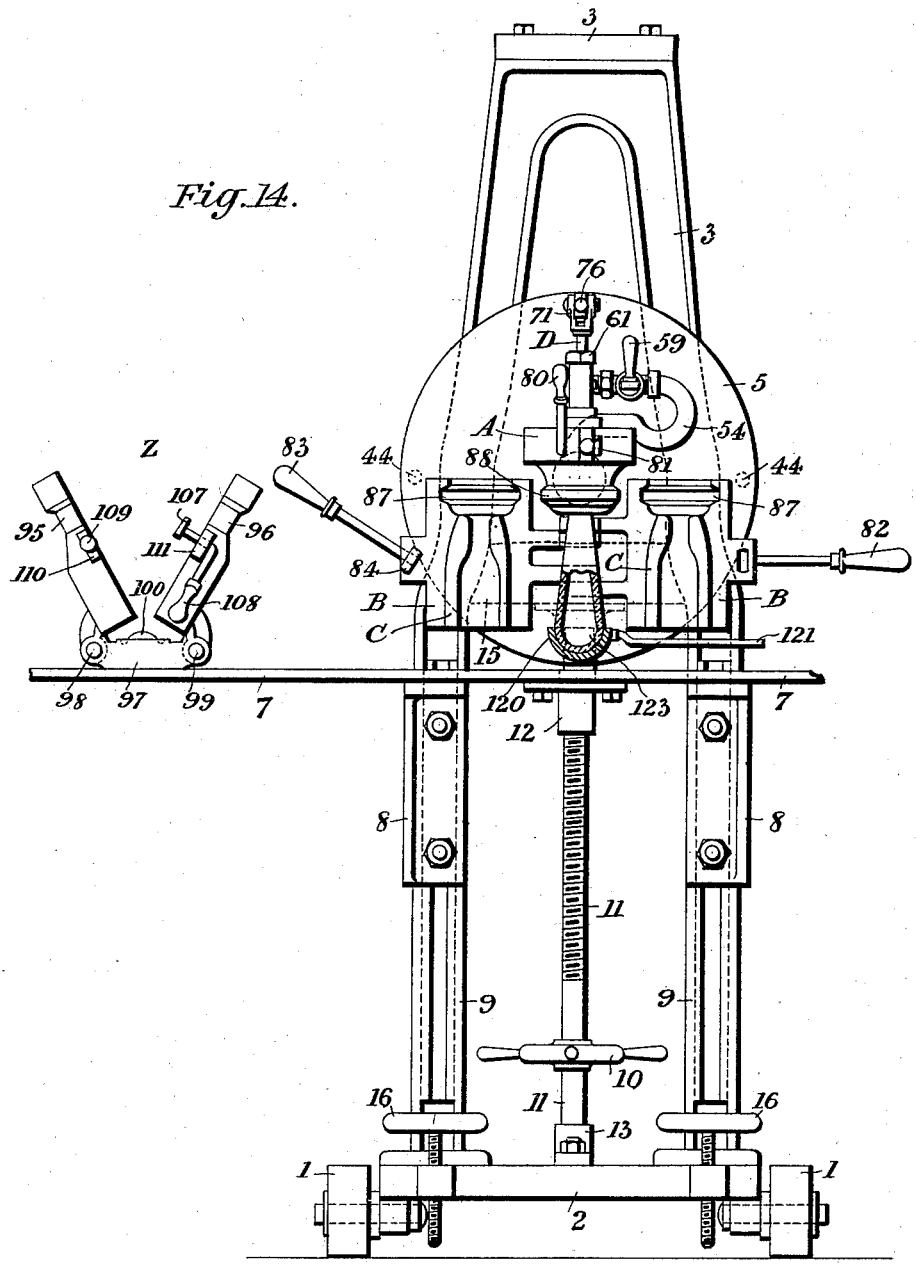
Figure 16:
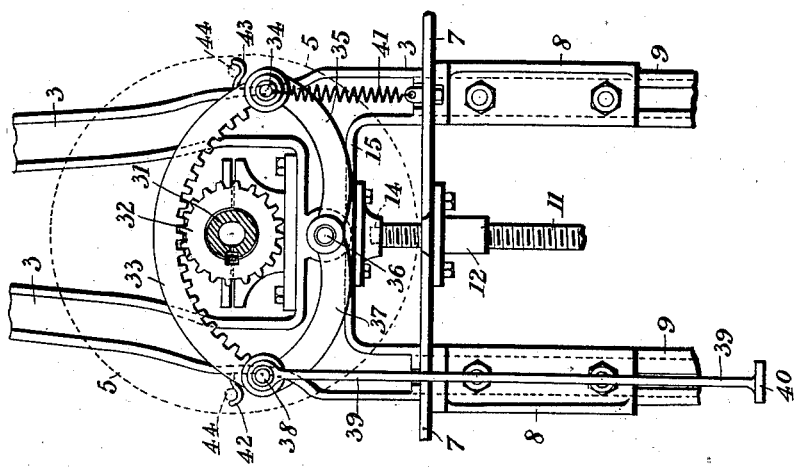
Figure 15:
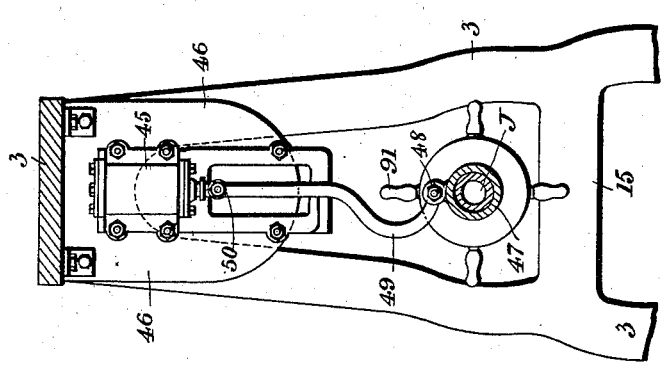
Figure 17:
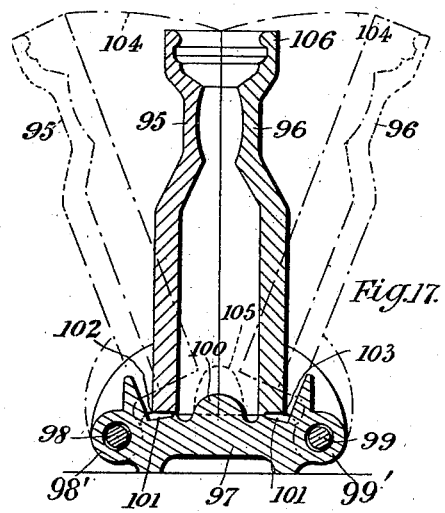
Figure 18:
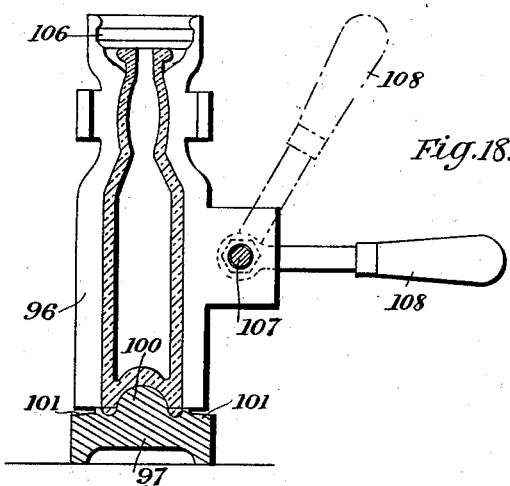
Figure 20:
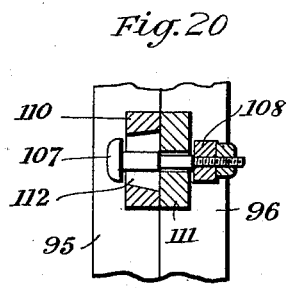
Figure 19:
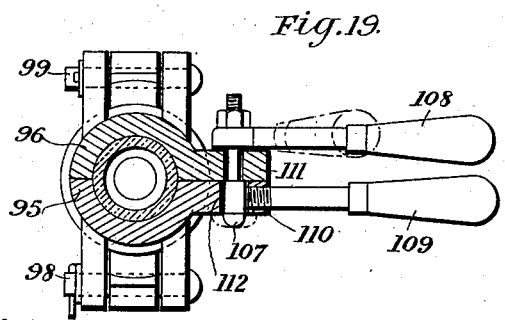
Figures 21, 22:
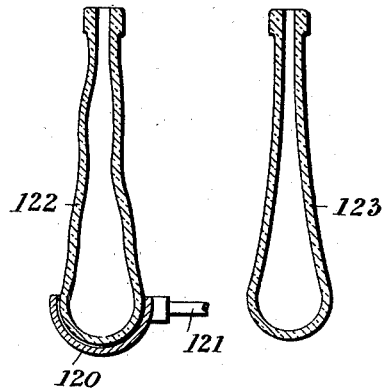
Figure 23:
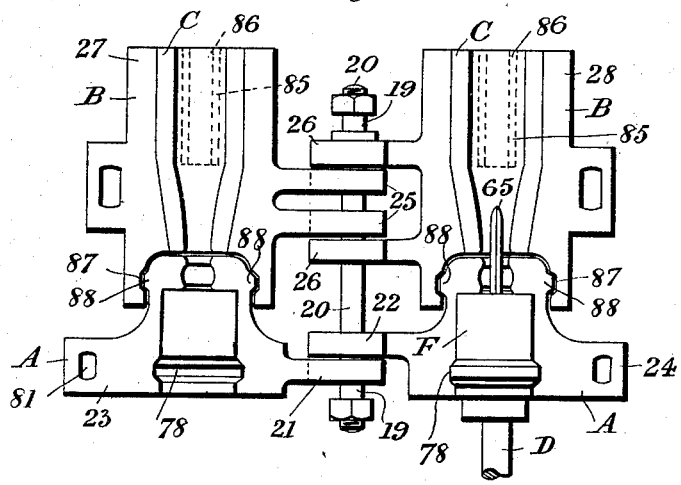
Figure 24:
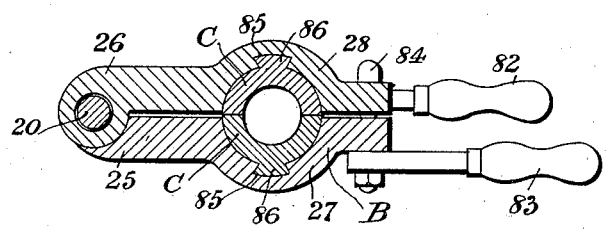

Figures 1 to 6, inclusive, are fragmentary sectional views illustrating the operation of producing a blown bottle by machinery with the aid of the improved mouth-forming and air-admitting plunger. Fig. 7 is an elevation, partly in section, in a plane at right angles to that of Fig. 6. Fig. 8 represents a cross-section through the plunger and its casing on the line $a\,b$, Fig. 7. Fig. 9 represents a cross-section through the plunger and its casing and a rotary bushing within the latter on the line $c\,d$, Fig. 7; and Figs. 10 and 11 represent sections through the air-cock, showing its two positions intermediate between closed, Fig. 1, and opened, Fig. 2. Fig. 12 is an elevation, partly in section, of a double form of machine in accordance with my invention as a whole. Fig. 13 is a plan view, partly in section. Fig. 14 is an end elevation. Fig. 15 is a section on the line $e\,f$, Fig. 12. Fig. 16 is a section on the line $g\,i$, Fig. 12. Figs. 17, 18, 19, and 20 illustrate various finishing or blowing molds and their closing devices in sectional elevation, cross-section, and detail. Figs. 21 and 22 represent the molded glass before and after it is worked or "paddled." Figs. 23 and 24 show a measuring or parison mold, the former showing also a neck-mold, a plunger, and the "middle part" of a plunger-casing; and Fig. 25 is an axial section on a larger scale.

Like letters and numbers refer to like parts in all the figures.

A may represent a head-mold or neck-mold; B, a parison-mold casing; C, a parison-mold lining or parison-mold; D, a mouth-forming and air-admitting plunger; E, a plunger-casing; F, a middle piece combined with the latter as part thereof; H the shell, and H' the spigot or plug, of an air-cock; G, an air-conduit controlled by said air-cock, and Z a finishing body and bottom mold or blowing-mold.

The casing E, the middle piece F, the shell H of the air-cock, and the air-conduit G are rigidly united with each other by screw-joints, as shown in Figs. 1, 6, and 7.

In operation a closed parison-mold C and a closed neck-mold A are first combined with each other and supported in inverted position in line with the middle piece F and in communication therewith, as shown in Figs. 1 to 3, inclusive. The plunger D being in its retracted position and the air-cock H H' closed, the glass X for a bottle is introduced into the parison-mold C in molten condition and in customary manner, as illustrated by Fig. 1, and flows freely into the matrical cavity of the neck-mold A to cast the bottle-head. An instant later the flattened mouth-forming portion 65 of the plunger D is thrust axially upward into the molten glass, as illustrated by Fig. 2, and immediately thereafter it is retracted, as illustrated by Fig. 3, its reciprocation being accompanied by a rapid rotary movement, which throws portions of the displaced glass centrifugally outward within the neck-mold to fill out the head or ring perfectly, and produces a perfectly round and smooth cork-receiving mouth and an effective initial cavity for the admission of air in the blowing operation. Before the operation of the plunger D or during the period illustrated by Fig. 1 the molten glass is kept from flowing into the casing E or the middle piece F, which is a continuation of the same, by a swiveled bushing 66, having a bore 165, corresponding in cross-section with the flattened mouth-forming portion 65, as shown in Fig. 8, and a circumferential groove 67, which receives loosely a stud 68, Fig. 7, formed by the inner end of a screw inserted through the middle piece F. The spaces at the flat sides of the mouth-forming portion 65 are thus reduced to a sufficient extent to exclude molten glass, while they may at the same time be of ample extent for the passage of air. An axial counterbore 164 limits the length of the bore 165 to reduce friction. A circumferential shoulder 163 coacts with an internal shoulder 162 within the middle piece F to prevent the displacement of the bushing, and the end face 161 of the bushing assists in shaping the lip of the bottle. The bushing also centers the mouth-forming portion 65 and forms a guide therefor. The plunger D may conveniently be reciprocated and simultaneously rotated, as above described with reference to Figs. 2 and 3, by the mechanical means shown in Figs. 1, 6, and 7. In these figures, 74 represents a yoke swiveled to the plunger D by an axial screw-stem 72 and nut 73, together with a ball-bearing 75. 30 represents a hand-lever having a slot 69 and coupled to the yoke 74 by a pin 70 and ears 71 on the yoke. 63 represents a spiral groove of rapid pitch in a cylindrical portion of the plunger D, and 62 represents a stud formed by a screw inserted through the middle piece F to coact with said groove. Said stud 62 being relatively stationary, the swiveled body and mouth-forming portion of the plunger are rotated by the coaction of said stud 62 and the spiral groove 63, when the plunger is reciprocated by means of the lever 30 and yoke 74. The swivel end of the plunger D is cylindrical and works through an air-tight stuffing-box 61 at the corresponding end of the casing E, and the plunger is preferably and conveniently provided within the casing with an air-propelling shoulder 160, before which sufficient air is forced out of the air-chamber 159 of the casing around the mouth-forming portion 65 to keep the molten glass from adhering to said mouth-forming portion when it is projected into the glass, as in Fig 2, and during its retraction in case the plunger should be actuated before turning on the air from the conduit G by means of the cock H H'. The air-cock is opened slightly, as in Fig. 10, before the parison and neck molds are reversed from the casting and punching position, Figs. 1, 2, and 3, so as to begin at once the expansion of the initial cavity formed by the mouth-forming portion 65, as in Fig. 3. To facilitate so manipulating the air-cock, the plug H' is preferably constructed with a flaring peripheral passage $h'$, leading into its direct port $h$, and a peripheral passage $h^2$, leading out of said port, before the port is directly opened. As soon as the operator begins to manipulate the air-cock plug H' by means of its handle 59 the parison-mold C, neck-mold A, and plunger D, together with their appurtenances, as in Figs. 1, 2, and 3, are reversed into the position in which said neck-mold A and plunger D, with their appurtenances, are shown in Fig. 4, the reversed parison-mold C by means of its casing B being immediately opened and moved out of the way, so as to leave the glass suspended in the open air, as shown at Y in Figs. 4, 5, and 14. The air-cock is now opened somewhat more, as illustrated by Fig. 11, and the depending glass, acted on by gravity and the air-pressure within it, quickly elongates, but with external inequalities of surface and inequalities of thickness of wall, especially in that portion which is to form the bottom of the bottle. (See Figs. 4 and 21.) The bottom-glass should next be worked by means of a spoon-shaped paddle 120, having a handle 121, as illustrated by Figs. 5, 14, and 21, until it is homogeneous and of equal thickness of wall, as represented at 123. This operation is more fully set forth in said patent specification and forms no part of the present invention, but is shown and mentioned with reference to a full disclosure. The finishing body and bottom mold Z is then combined with the neck-mold A, as in Fig. 6, and the air-cock H H' is fully opened, as in that figure, to complete the blowing operation. Within the finishing-mold the large body of air expanded by contact with the hot glass has heretofore been liable to exert an undue pressure and even to burst the bottle when the finishing-mold is opened. This is prevented by the preferred plunger-operating device above described, as illustrated in Fig. 6. The plunger being retracted, the spiral groove 63 extends beyond the communication 58 between the air-chamber 159 and the air-cock, so that if the latter be open, as in Fig. 6, the pressure is quickly equalized with the standard pressure within the pressure end of the conduit G, and if the cock be closed the capacity of said chamber 159 and groove 63 may be and in practice is sufficient to accommodate the surplus of air. In either case the bottle is protected against being burst by excessive air-pressure within it. Finally, the neck-mold A and finishing body and bottom mold Z are opened and the completed bottle Z', Fig. 6, is removed from the machine. The neck-mold A is then closed, the parison-mold C replaced, these molds, with their appurtenances, inverted, and the cycle of operations again begun, as in Fig. 1.

Figs. 12 and 13 illustrate a double form of my improved glass-blowing machine. Of course it may, if preferred, be made as a single machine—that is to say, without either the right or the left hand half, as illustrated. Upon a platform 2, which is adapted to run upon wheels 1, are fixed the standards 3, serving as supports for the shaft 4, which carries the rotary disk or disks 5. With this object the shaft 4 is arranged in bearings within the standards 3 in such a manner as to be capable of rotation back and forth. Beneath the disk 5 or each of the disks is provided a table 7, serving for the reception of the finishing-mold Z and of the finished bottle Z'. This table 7 is guided vertically by means of a bracket 8 in a slide 9 upon the front of the standards 3 and is raised or lowered by means of a screw 11, provided with a hand-wheel 10, the thread of such screw engaging in a nut 12, which is rigidly fixed to the table. The screw rotates in a step-bearing 13 upon the platform 2 and at its upper end 14 rotates in a vertical bearing-block 15, fixed to the frame. By this means it is possible to raise and lower the work-table 7 to any desired extent with respect to the rotary disk 5. The platform 2 may be provided with set-screws 16 to fix the machine to the floor at any desired point. Upon the rotary disk 5 are arranged the devices which serve for the formation of the head of the bottle and the partly-formed bottle—that is to say, the neck and parison molds and also the air-supply conduits. The rotary disk is provided with slots 17, in which the arms 19 are adapted to be adjustably fixed by means of nuts 18. The arms 19 are connected one with the other by means of a hinge-bolt 20, upon which the two halves 23 24 of the neck-mold A are suspended by means of arms 21 and 22, while the two halves 27 28 of the casing B for the parison-mold C are suspended by means of the arms 25 and 26. In addition to this there is hinged upon the disk 5 by means of a short screw-bolt 29 the hand-lever 30, already referred to, and it carries therewith the plunger D, casing E, middle piece F, conduit G, and air-cock H H'.

As hereinbefore described, the parison-mold C must be directed upward when filled, so that the neck-mold A lies below the parison-mold, Fig. 12, left, while the molded glass must depend downward from the neck-mold A during the paddling operation, and the finishing-mold Z also hangs downward, so that the disk 5 must be caused to rotate through one hundred and eighty degrees. The rotation of the disk 5 to this extent and its stopping when this has been effected is or may be advantageously effected by means of the depression of a treadle through the medium of the following parts: Upon the hub 31 of the disk 5 is rigidly fixed a toothed wheel 32, with which engages a curved rack 33. This rack 33 is pivoted at 34 to a bent lever-arm 35, adapted to oscillate around a pivot 36. Upon this pivot is also rotatably mounted a bent lever-arm 37, which is pivoted to the other extremity of the rack 33 by means of a bolt 38. Upon the bolt 38 is also pivotally mounted a rod 39, which is provided at its lower extremity with the treadle 40. The lever, composed of the arms 35 and 37, and with it the curved rack 33, is caused to resume its initial position by means of a spring 41, fixed to the bolt 34, while its lower extremity is fixed to the standards 3, so that the treadle 40 is again drawn upward, when it is no longer held down by the operative. The radius of the curve of the rack 33 is determined in such a manner that owing to its being guided by the lever-arms 35 and 37 this rack remains constantly in engagement with the toothed wheel 32. When the operative acts upon the treadle 40, he draws downward one end of the rack 33 by means of the rod 39, causing the lever-arms 35 and 37 to rotate around the pivot 36. By this means the spring 41 is stretched. The rack 33 causes the toothed wheel 32 to turn through one hundred and eighty degrees, the lever-arms 35 and 37 causing the constant engagement of the rack 33 with the gear-wheel 32. When the treadle 40 is released, the stretched spring 41 will draw the rack 33 back into its initial position, (see Figs. 12 and 16,) and thus return the disk 5 to its former position. By these means the rotary disk will be caused to rotate through one hundred and eighty degrees, first in one direction and then in another. In order to limit this movement exactly to the required amount, the following arrangement is provided: Upon the rear side of the disk 5 is provided a pin 44, Figs. 14 and 16, which strikes against two studs or stops 42 and 43, fixed upon the standards 3 in any suitable positions diametrically opposite to one another. If the disk is caused to rotate by acting upon the treadle 40, such rotation can only continue until the pin 44 strikes against the stop 42 on the frame 3. (Shown by dotted lines in Fig. 16.) When the spring 41 draws back the rack 33, and with it the disk 5, this rotation can only continue until the pin 44 upon the disk strikes against the stop 43. (Shown in Fig. 16 in full lines.) The position of the stops 42 and 43 upon the frame is determined in such a manner that upon being caused to rotate the disk 5 will describe exactly one hundred and eighty degrees, Figs. 12, 13, and 16.

The rotation of each of the disks 5 is utilized for automatically producing the compressed air required for the preliminary blowing and for blowing the bottle in the finishing-mold in the following manner: When the disk 5 is rotated, an air-compressing pump or air-compressing pumps 45, Figs. 12 and 15, is or are actuated, the compressed air being stored in a reservoir 46. Upon the shaft 4 of the disk 5 is rigidly fixed a collar 47, provided with a crank-pin 48. This latter actuates the pump-connecting rod 49, the other extremity of which engages with the cross-head bolt 50. This latter is connected to the piston-rod 51 of the pump 45. The air-compressing pump may be of any convenient construction—for instance, a double-acting pump, as illustrated. The reservoir 46, Fig. 12, is provided with an air-supply conduit 52, which terminates in a T-piece 53, Fig. 25, through which the air passes to an axial air-conduit J within the axis of each disk. From the air-conduit J the air passes through the corresponding pipe 54 into the corresponding conduit G, thence proceeding into the casing E of the corresponding plunger D.

The conduit 52, leading from the air-reservoir 46, is provided with a cock 55, and the reservoir is provided with a pressure-gage 56 in order to indicate the air-pressure. (See Fig. 12.) In order that the quantity of the compressed air may be regulated as desired, the stroke of the pump 45 may be altered, for instance, by varying the position of the crank-pin 48 relatively to the hollow shaft 4 or as regards eccentricity, or there may be provided between the two ends of the air-pump cylinder in the known manner a circulation-conduit, a cock being also provided, so that, if desired, the air or a portion thereof may pass back from the compression side to the suction side.

As the mold-casing B fits upon the neck-mold A, any desired parison-molds C may be inclosed in a single mold-casing. It is necessary that the molds should fit the neck-mold well, and when a mold-casing is employed the manufacture of a single part, nicely adjusted in this respect, is all that is necessary. The parison-molds may then be inserted in the mold-casing in any desired manner. The mold-casing B, Figs. 23 and 24, is in two parts and is provided with handles 82 83. Of these the handle 82 is rigidly connected with the half 28 of the mold-casing, while the handle 83 is rotatably mounted in the half 27 and locks the mold-casing halves 27 and 28 together by means of the button 84. By means of the arms 25 and 26 the two halves 27 and 28 of the mold-casing are attached to a common pivot 20. In the mold-casing dovetail grooves 85 are formed, running vertically to the transverse axis of the mold-casing. These grooves serve for the reception of corresponding dovetail projections upon the parison-mold C. The mold-casing is provided with annular grooves 87, which inclose the projections 88 of the neck-mold A. The parison-mold is shaped smoothly, and it is therefore not necessary to provide it with such grooves 87, thus effecting an important economy in costly parison-molds. By the employment of these divided mold-casings and of interchangeable parison-molds it is also possible to use several parison-molds of the same dimensions, which constitutes a great advantage in the case of my blowing-machine, as they may be used many times in succession, while separate molds would become heated to too great an extent if employed in this manner. It is therefore only necessary to have several parison-molds cooled ready for insertion.

The casing E, which serves to guide each plunger D, fits centrally in the corresponding neck-mold. The distance of the center of the neck-mold from the disk 5 is regulated by the length of its arms 21 22. The position of the plunger D with respect to the surface of the disk 5 varies with the center of the neck-mold, the slot 69 enabling the plunger to be adjusted with regard to the hand-lever 30, which is pivoted to the disk 5 by means of the screw-bolt 29. The corresponding adjustment of each of the pipes 54 is effected in the following manner: The shaft 4, upon which the disk 5 is mounted, is hollow and receives a pipe 89, which is externally screw-threaded. The pipe 54 opens into the pipe 89 at its extremity adjacent to the disk by means of a hollow plug 90. Upon its inner extremity the shaft 4 is provided with a sleeve 92 internally screw-threaded and furnished with a hand-wheel 91, which is rotatable upon the shaft 4 and is maintained in position axially by means of a split ring 93. If the screw-threaded sleeve 92 is turned, the outer end of the plug 90 may be either drawn toward the disk 5 or moved away from the same. The T-piece 53, which conducts the air from the reservoir 46 through the pipe 52 and the cock 55 to the pipe 89, is made tight in the latter by means of a stuffing-box 94, Fig. 25, so that upon the adjustment of the pipe 89 the air-passage is in no wise interrupted. By means therefore of the hand-wheel 91 it is possible to so adjust the plunger D that it is central with respect to neck and parison molds of any desired size and arranged at any desired distance from the disk 5.

The two body-halves 95 and 96 of each blowing-mold Z, Figs. 6 and 17 to 20, are preferably rotatable around lateral hinges 98 99, which are arranged some distance outside the bottom in special lugs upon the same. The bottom 97 constitutes a distinct part, and outside the central raised part 100 is formed a smooth annular surface 101, upon which the bottom ends of the two parts 95 and 96 of the mold rest, being cut away, as at 102 and 103, so as not to bind. Now if such a mold is opened the two mold-halves upon being turned back upon their hinges 98 and 99 away from the axis of the bottle describe an ascending path 104, Fig. 17. As a consequence of this the finished bottle which has been blown in the blowing-mold will be slightly raised from the bottom upon the opening of the mold if there is any tendency to bind. As soon, however, as it is released by the mold-halves it remains upright upon the bottom. It is therefore possible to manufacture bottles having a pronounced curvature at the bottom, such as indicated by the line 105, Fig. 17, without liability of the finished bottle being gripped in the bottom upon the opening of the mold. The mold-halves 95 96 are fitted to the neck-mold A and for this purpose are provided with an internal groove 106, which corresponds with the groove 87 of the parison-mold casing and serves for the reception of the projection 88 upon the neck-mold. The blowing-mold is closed by means of a button 107, Figs. 19 and 20, which is provided with a handle 108 and is pivotally mounted in the half 96 of the blowing-mold. Another handle 109, which is fitted to the other mold-half 95, serves to enable the mold to be opened and closed with greater ease. For the reception and retaining of the button the two mold-halves are provided with projecting portions 110 111. The projection 110 is formed with an aperture 112 to admit of the passage of the button 107.

The manipulation and operation of the improved machine are as follows: Before any bottles are blown the operative must cause the disk 5 to rotate to and fro several times by acting upon the treadle 40 in order to charge the air-reservoir 46 with compressed air by the operation of the air-pump 45. The mold-casing B of a parison-mold C is then fitted around the corresponding neck-mold A after a parison-mold of suitable size has been inserted in the mold-casing. The disk 5 is then caused to occupy such a position that the open (bottom) end of the parison-mold is directed upward. In this position of the parison-mold the pin 44 upon the disk will bear upon the stop 43 upon the frame, Fig. 12, left hand. The head casting or molding and punching operations are then performed and the introduction of air is begun, as above described with reference to Figs. 1, 2, and 3. The treadle 40 is then released, thus permitting the spring 41 to act, and thereby causing the disk 5 to rotate through one hundred and eighty degrees until the pin 44 upon the disk strikes upon the stop 42 on the frame of the machine, Fig. 12, right-hand side, and Fig. 16. The lever 30 is then uppermost and the mass of glass is suspended from the neck-mold. The parison-mold is then opened to such an extent as to permit the mass of glass to depend freely from the neck-mold, Fig. 4. In order that this may be effected, the arms 25 and 26 of the halves of the mold-casing B are made of a length sufficient to allow the latter to be laid right back, and thereby prevent the parison-mold parts from being in the way during the subsequent treatment of the parison, Fig. 5, and to permit a blowing-mold Z being subsequently alined with the neck-mold. When the blowing of the bottle has been completed, the halves 95 96 of the blowing-mold are opened somewhat, as are also the halves 23 24 of the neck-mold, in order to release the bottle. The blowing-mold is then placed to one side, its halves again closing, the bottle being allowed to cool somewhat in the mold. The neck-mold is then again closed and the parison-mold again attached thereto by means of its mold-casing, while by acting upon the treadle 40 the pin 44 of the disk 5 is caused to strike against the stop 43—that is to say, the disk is caused to make another half-turn. By means of this movement fresh air for the production of a fresh bottle is compressed by means of the air-pump 45 and conducted into the reservoir 46. The cycle of operations is then repeated in the manner already described, and so on.

The mouth-forming portion 65 may be triangular or of other suitable shape in cross-section instead of being square, as shown. The term "flattened" is intended to include all such variations and the term "imperforate" to include hollow but imperforate as the equivalent of solid. The mouth-forming portion 65 of the plunger will in all cases be adapted to receive the reciprocating and rotary movements which primarily characterize it; but said portion 65 may be either integral with the body of the plunger or attached thereto in any approved way. Other like modifications will suggest themselves to those skilled in the art.

Having now described my invention, what I claim as new, and desire to secure by Letters Patent of the United States, is—

1. A glass-bottle-blowing machine having, in combination, a mold in which the head of the bottle is cast, a plunger having a flattened mouth-forming portion, and means for simultaneously rotating and thrusting the same into the molten glass while within said mold.

2. A glass-bottle-blowing machine having, in combination, a mold in which the head of the bottle is cast, a plunger having a flattened mouth-forming portion, and means for thrusting the same into the molten glass while within said mold, and for retracting the same, and for rotating the same during the longitudinal movement.

3. A glass-bottle-blowing machine having, in combination, a mold in which the head of the bottle is cast, an imperforate plunger having a flattened mouth-forming portion, and means for thrusting the same into the molten glass while within said mold, for retracting the same and for rotating the same during its longitudinal movement.

4. A glass-bottle-blowing machine having, in combination, a mold in which the head of the bottle is cast, a centrifugal mouth-forming plunger, and means for simultaneously rotating and thrusting the same into the molten glass while within said mold, thereby solidifying the head of the bottle, and shaping its mouth to receive a cork.

5. A glass-bottle-blowing machine having, in combination, a mold in which the head of the bottle is cast, a plunger having a flattened mouth-forming portion, a casing surrounding the plunger in which the plunger may rotate freely, and which admits air around the plunger, and means for thrusting the mouth-forming portion of the plunger into the molten glass in the mold and for rotating the same to form the mouth with a smooth inner cylindrical surface.

6. A glass-bottle-blowing machine having, in combination, a mold in which the head of the bottle is cast, an imperforate plunger having a flattened mouth-forming portion, a casing surrounding the plunger in which the plunger may rotate freely, and which admits air around the plunger, and means for supplying air under pressure to the casing and for thrusting the mouth-forming portion of the plunger into the molten glass in the mold and for rotating the same to form the mouth with a smooth inner cylindrical surface.

7. A glass-bottle-blowing machine having, in combination, a mold in which the head of the bottle is cast in inverted position, a plunger having a flattened mouth-forming portion, means for thrusting the same upward into the molten glass and retracting the same and for simultaneously rotating the same, a casing for said plunger, and a swiveled bushing within said casing having a bore corresponding in cross-section with said mouth-forming portion.

8. A glass-bottle-blowing machine having, in combination, a mold in which the head of the bottle is cast in inverted position, an imperforate plunger having a flattened mouth-forming portion, means for thrusting the same upward into the molten glass and for retracting and for simultaneously rotating the same, a casing for said plunger, and means for forcing air into the glass simultaneously with and around said mouth-forming portion.

9. A glass-bottle-blowing machine having, in combination, a mold in which the head of the bottle is cast in inverted position, an imperforate plunger having a flattened mouth-forming portion and an air-propelling shoulder, a casing for said plunger having an air-chamber discharging around said mouth-forming portion, and means for reciprocating and rotating said plunger.

10. A glass-bottle-blowing machine having, in combination, a mold, a rotatable plunger having a spiral groove therein and an imperforate flattened mouth-forming portion adapted to enter the molten glass, and a casing for said plunger, said spiral groove forming a vent for the escape by way of said casing of heated air of excessive pressure.

11. A glass-bottle-blowing machine having, in combination, a casing, a neck-mold clasped upon said casing and other molds adapted to be alined with said neck-mold, a rotatable plunger reciprocating through said casing and having a spiral groove therein, a stud in said casing engaging said spiral groove, an air-conduit communicating with said casing, and means for reciprocating said plunger.

12. In a glass-bottle-blowing machine, the combination with a disk having a hub thereon, molds carried by said disk, and a toothed pinion on the hub of said disk, of a toothed segment engaging said pinion, lever-arms pivoted to the ends of said segment and to the frame of the machine, a spring connected with one end of the segment and a treadle connected with the other end of said segment to turn said disk, and stops on the disk and on the frame of the machine to limit the rotation of said disk.

13. In a glass-bottle-blowing machine, the combination with a shaft, a disk mounted on said shaft, molds carried by said disk, and means for rotating said disk through one-half a revolution, of an air-pump connected with said shaft to be operated by the rotation of said disk.

14. In a glass-bottle-blowing machine, the combination with a shaft, a disk mounted on said shaft, molds carried by said disk, and means for rotating said disk through one-half a revolution, of an air-reservoir, an air-duct leading from the reservoir through said shaft and disk to the molds, and an air-pump, communicating with said reservoir and connected with the shaft, to be operated by the rotation of the disk, substantially as described.

In witness whereof I have hereunto set my hand in presence of two witnesses.

LUDWIG GROTE.

Witnesses:
E. GANDER,
A. NUTTING.